Nov. 19, 1957     H. G. FITZ GERALD     2,813,457
IMAGE COMPOSING APPARATUS

Filed May 24, 1954     2 Sheets-Sheet 1

INVENTOR.
HAROLD G. FITZGERALD,
BY
AGENT.

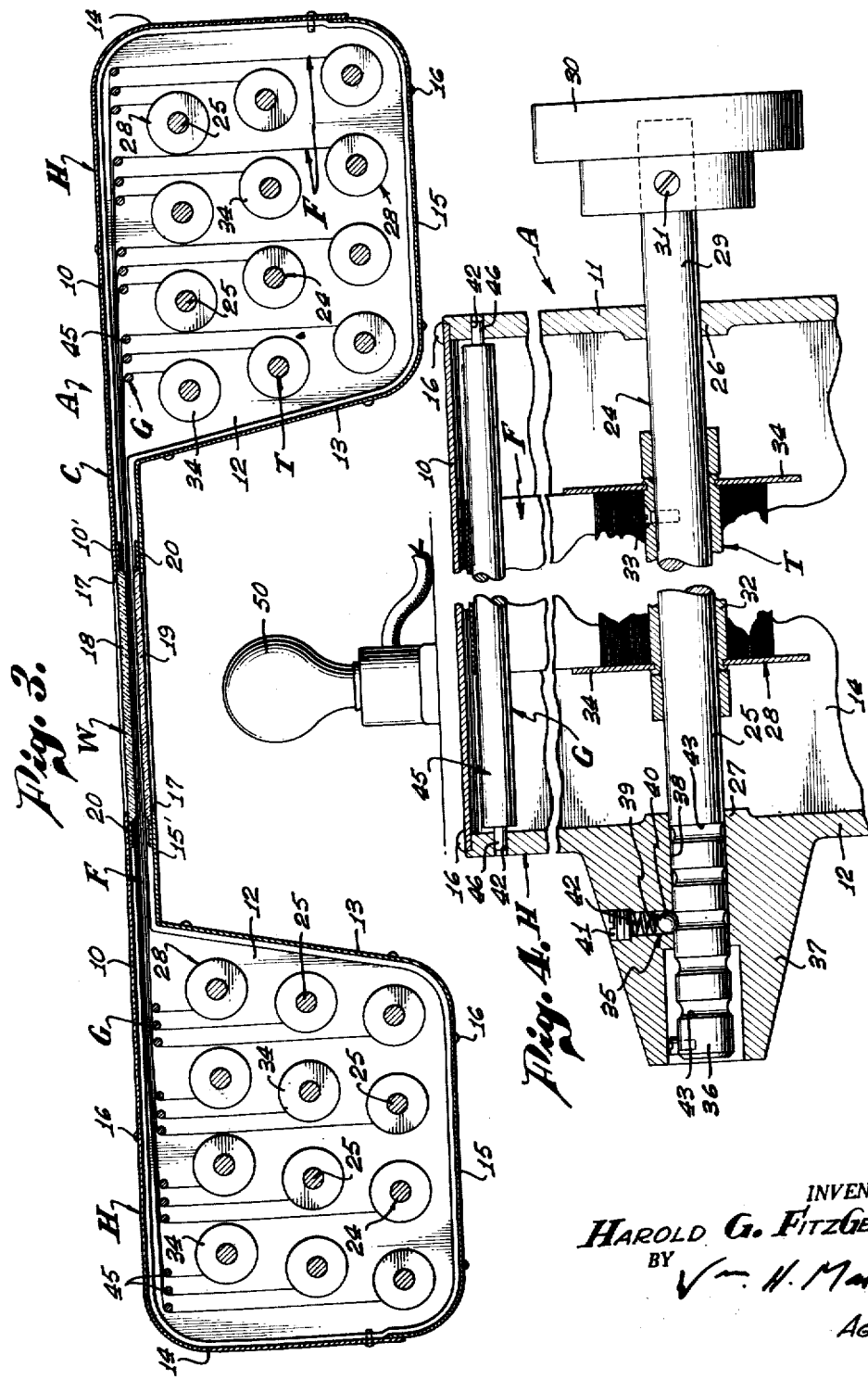

United States Patent Office 2,813,457
Patented Nov. 19, 1957

2,813,457

IMAGE COMPOSING APPARATUS

Harold Groves Fitz Gerald, Los Angeles, Calif.

Application May 24, 1954, Serial No. 431,696

3 Claims. (Cl. 88—28)

This invention is concerned with an apparatus for composing a picture or image by superimposing a plurality of transparencies, each of which is provided with a picture of a feature or character that when combined with one or more pictures of features or characters on one or more of the other transparencies, establishes a desired composite picture or image.

The particular apparatus that I provide is adapted to be used in composing pictures in the manner referred to for the purpose of establishing identity as, for example, the identity of a person who is sought or whose facial characteristics are to be established.

It is a general object of the invention to provide an apparatus for composing pictures for the purpose of identification, that is rapid, practical and accurate in operation and which does not require the exercise of any great or unusual skill to operate.

It is a general object of the invention to provide a unitary apparatus of the character referred to adapted to handle collections or groups of representative facial features, or the like, from which those entering into the face or picture to be composed can be easily and quickly selected and combined into a composite image.

It is an object of the present invention to provide an apparatus for establishing a pictorial image or representation of the general character referred to, which can be advantageously combined with a light projecting unit to project the composed image or picture onto a screen, or the like.

It is another object of the invention to provide a structure that is both simple and economical to manufacture.

Another object of the invention is to provide an apparatus for handling a plurality of elongate strips of films and to selectively shift each of said strips of film longitudinally and laterally relative to said other films.

Still another object of the present invention is to provide an apparatus of the character referred to that is neat and compact and which can be easily operated, stored, transported or otherwise handled.

The apparatus as provided by the present invention involves, generally, an elongate body having a central transparent window therein, a pair of like housing at each end of the body, a plurality of elongate strips of film within the body, each strip of film being provided with a plurality of markings or pictures spaced along its longitudinal extent, one of which markings or pictures of each strip of film is to be utilized in composing the desired image or picture, a pair of longitudinally spaced spools for each strip of film and located in the housings at the ends of the body, and manual operating means for each spool accessible at the exterior of the body and adapted to transport the strips of film longitudinally of the body to pass the window therein, and to shift the strips of film transversely thereof.

The various objects and features of my invention will be fully understood from the following detailed description of a typical preferred form and application of my invention, throughout which description reference is made to the accompanying drawings, in which:

Fig. 3 is a longitudinal sectional view taken as indicated by line 3—3 on Fig. 1 and showing the structure removed from the projection.

Fig. 4 is an enlarged detailed sectional view taken as indicated by line 4—4 on Fig. 3.

Figure 1:
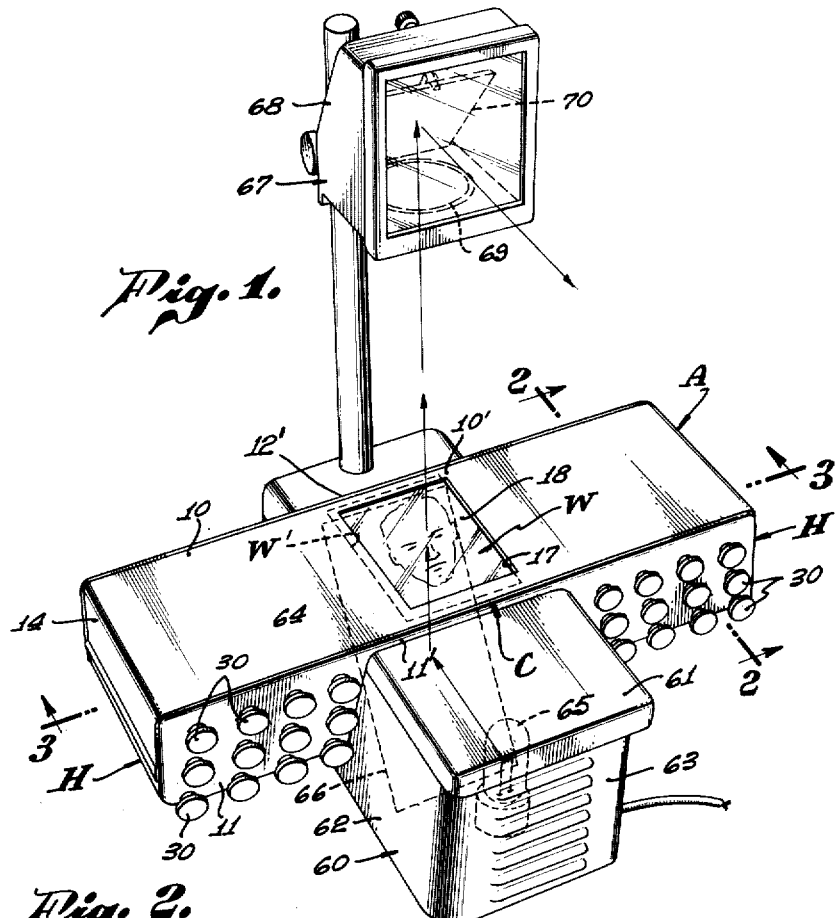
Fig. 1 is a perspective view of the structure provided by the present invention, showing it arranged in cooperative engagement with a light projecting mechanism.
Figure 2:
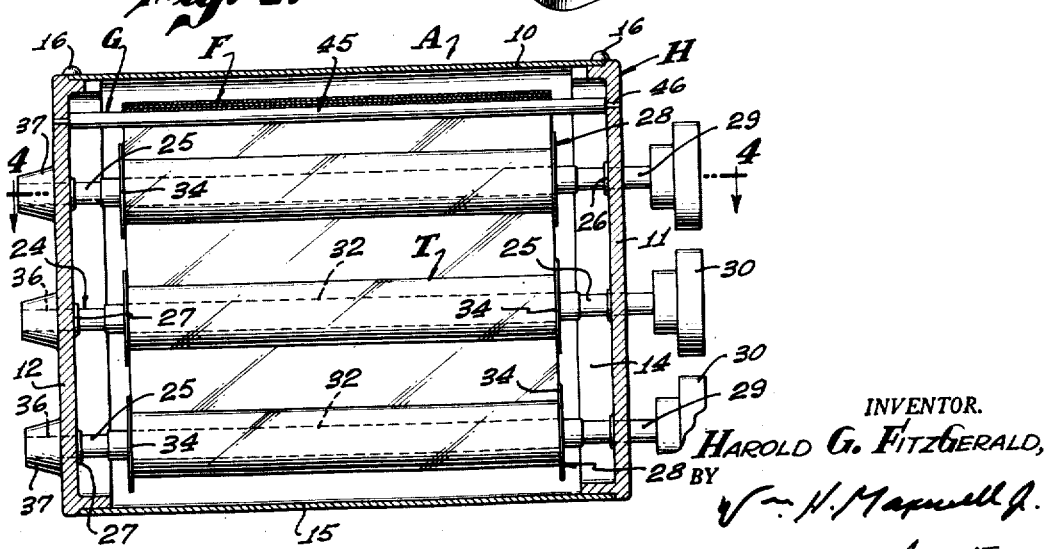
Fig. 2 is an enlarged transverse sectional view taken as indicated by line 2—2 of Fig. 1.

The image composing apparatus provided by the present invention includes, generally, a body A, a plurality of elongate strips of film F carried by the body, film transporting means T carried by the body and adapted to shift the film therein, and guide means G guiding the films in the body.

The body A is characterized by two box-like housings H arranged in fixed spaced relationship and adapted to house and support the film transporting means T and the film guide means G, and a central film handling duct C extending between the upper adjacent side edges of the box-like housings H and adapted to conduct the films between the housings H in stacked relationship to each other.

Each housing H of the body A is characterized by a horizontally disposed top wall 10, vertically disposed front and rear side walls 11 and 12, respectively, vertically disposed inner and outer end walls 13 and 14, respectively, and a flat horizontally disposed bottom wall 15. The middle duct portion C of the body A is shown as including, a flat horizontally disposed top wall 10', vertically disposed front and rear side walls 11' and 12', respectively, and a flat horizontally disposed bottom wall 15'.

In the preferred carrying out of the invention, the top walls 10 and 10' of the housings H and the central duct portions C of the body A, occur in a common horizontal plane and are advantageously formed of one continuous strip of sheet metal, or the like. In like manner, the front side walls 11 and 11' and the rear side walls 12 and 12' of housings H and central duct portions C of the body A occur in common vertical plane and are, in the preferred carrying out of the invention, integrally cast or molded to establish unitary side walls coextensive with the longitudinal extent of the body A.

The horizontally disposed bottom walls 15 and 15' of the housings H and central duct portions C of the body A occur in vertically spaced horizontal planes, and the vertically disposed inner, or opposing end walls 13 of the housings H which extend between and join the bottom walls 15 and 15' are preferably integrally formed as one continuous elongate element coextensive with the longitudinal extent of the body.

In the particular form of the invention illustrated, the outer end walls 14 of the housings H, are formed and shown as being in the nature of depending extensions or continuations of top wall 10—10' and depend from the ends thereof to close the outer ends of the housings H and to overlie the outer terminal end of the bottom wall 15 at the lower outside corner of each housing.

In practice, the various parts referred to above that combine to form the body A are secured together in fixed cooperative relationship by means of screw fasteners 16.

The top wall 10' and bottom wall 15' of the central duct portion C of the body A are provided with registering openings 17 establishing a light opening or window W adapted to pass light vertically through the duct C of the body and through the plurality of films F extending therethrough. The window W is shown as having an upper glass panel 18 fixed to the under side of the top wall 10', and a lower glass panel 19 fixed to the upper side of the bottom wall 15', the upper and lower panels 18 and 19 being secured to their respective walls by means of suitable clips 20, welded or otherwise fixed to their respective walls.

The panels 18 and 19 in the window W are arranged in vertical spaced relationship relative to each other to slidably pass the plurality of films therebetween and are shown as having their edge portion suitably ground or tapered to permit free entrance of the film therebetween and to insure against cutting, scratching or otherwise damaging or mutilating the films.

The transporting means T adapted to shift the strips of film in the body A includes generally a pair of like horizontally disposed film handlers 24 for each strip of film. The handlers 24 of each pair of handlers are spaced apart longitudinally of each other to occur in the housings H at the opposite ends of the body A.

Each film handler 24 extends transversely of its respective housing H and includes an elongate shaft 25 rotatively supported by front and rear bearings 26 and 27 in the front and rear side walls 11 and 12 of said housing. A flanged spool 28 is releasably secured to each shaft 25 intermediate its ends to occur between the side walls 11 and 12 of the housing H and is adapted to receive or pay off its respective strip of film.

Each handler shaft 25 is further provided with a forward extension 29 which projects through the front bearing 26 in the front side wall 11 of the housing H and terminate at the exterior of the housing where it is provided with a suitable control knob 30 which can be advantageously engaged by the operator of the picture composing apparatus.

Each spool 28 is characterized by an elongate cylindrical hub 32 slidably engaged around the shaft 25 and secured in fixed relationship thereto by means of a switch set screw 33, a pair of longitudinally spaced annular flanges 34 suitably secured to the ends of the hub and adapted to guide the film F onto and off the hub.

It is to be understood that, in practice, spools 28 can vary widely in form and construction, and that the particular spool construction illustrated in the drawings is only a typical representation.

The control knobs 30 may, in practice, vary widely in form and construction, and I have chosen to illustrate simple annular disc-like knobs 30 releasably secured to the end of each shaft by means of a simple set screw 31.

It will be apparent from the above that when the control knob 30 of one of the pairs of film handlers 24 is manually rotated or turned by the operator, the film carried by the spool 28 thereof will be wound onto the spool, thereby drawing the film from the spool 28 of the other related film handler 24 so that it moves longitudinally of the body through the central duct portion C thereof and through the window W therein.

Each film handler 24 is further adapted to shift laterally of the body A so as to permit lateral positioning of adjustment of the film carried thereby relative to the other films and to the window W in the central duct portion C of the body A.

A suitable detent means 35 is provided for each film handler 24 to insure proper lateral positioning of the spool 28 relative to the body and longitudinal alignment with its related spool at the other end of the body. The detent means 35 of each handler 24 includes an extension 36 on each shaft 25 projecting rearwardly through the rear bearing 27 in the rear side wall 12 of the housing H and into a suitable boss 37 provided at the exterior of the housing. The boss 37 has a longitudinal opening 38 adapted to slidably receive the shaft extension 36, a lateral port 39 entering the boss from one side thereof and in communication with the opening therein, a closure 41 threaded into the outer end of the port, and a compression spring 42 engaged between the said closure 41 and the ball 40 and adapted to normally yieldingly urge the ball into bearing engagement with the extension 36 of the shaft 25 extending through the opening 38 in the boss. Each shaft extension 36 is provided with a plurality of longitudinally spaced annular grooves 43 adapted to be releasably and selectively engaged by the spring urged ball 40 carried by the boss 37 in which it is engaged.

With the structure set forth above it will be apparent that the operator of the compressing apparatus that I have provided can by pushing or pulling the control knobs 30 of each pair of film handlers 24 in or out, so that the balls 40 of the detent means 35 of each handler engage in corresponding grooves 43 in the shaft extension 36, advantageously shift the film carried by the said pair of film handlers 24, laterally relative to the body and to the other strips of film in the body and be assured of proper alignment of the spools onto which the said shifted film is wound, with the result that the film will not become wrinkled as it passes the window W in the central duct portion C of the body, and will not become disengaged from the spool 28 upon which it is being wound.

Each of the pluralities of film F provided by the present invention is in the nature of an elongate strip of transparent material having a plurality of longitudinally spaced sections or frames, each of which is substantially the same size as the window W in the central duct portion C of the body A. Each strip of film bears images of one particular facial feature, or element, that is, one strip of film may be devoted to hair, and each frame of that strip would have a picture of a different type or style of hair. Each of the other strips of film is devoted to different features or elements, as for instance, to eyes or ears.

With the relationship of films set forth above, it will be apparent by arranging a selected frame from each of the stacked, or superimposed, strips of film in the window W of the body A, a composite picture will be established of those selected features from each of the plurality of films, which composite picture may be viewed by looking through the window W and the plurality of films therein. It will be noted that the apparatus as provided by the present invention can be advantageously engaged with a picture projecting unit so that an image or picture composed in the image composer can be projected onto a screen in a manner that will be hereinafter described.

It is to be understood that each strip of film is provided with a leader portion at each of its ends so that each of the frames of the film can be passed through the window W without disengaging either of its ends from its related spools.

The film guide means G, provided by the present invention, is adapted to receive the films F as they leave the central duct portion C of the body and direct them downwardly onto the spools 28 of the film handlers 24, clear of the other handler, and also to direct the films horizontally into the duct as they are drawn upwardly from the spools 28 and through the said duct portion C.

The guide means G includes a pair of elongate horizontally disposed rollers 45 for each strip of film F. The rollers 45 extend transversely of the body A and are arranged in longitudinally spaced relationship to occur at opposite ends of the central duct portion C and within the housings H. Each roller is located in a housing H to occur above its respective film handler 24 therein.

Each pair of guide rollers 45 preferably occur in a plane vertically off-set from the other pairs of rollers, so that the uppermost periphery of each roller is tangential to the horizontal plane of the film handled thereby as it is slidably passed between the glass panels 18 and 19 of the window W in the central duct portion C.

In the form of the invention illustrated, each roller 45 is a simple, elongate element round in cross section and arranged in the body to extend between the front and rear side walls 11 and 12, or its respective housing H, and is provided with end portions 46 of reduced diameter rotatably engaged in bearings 42 in the said side walls of the body.

It is understood that, in practice, the number of films F and their respective transporting and guide means T and G can vary widely as circumstances may require. In the particular form of the invention illustrated, I have shown an image composing apparatus embodying the present invention employing 12 strips of film and a corresponding number of transporting means T and guide means G adapted to handle the films.

The film handlers 24 of the transporting means T in each housing H are arranged in longitudinally spaced groups, each group including two or more vertically spaced handlers. The film handlers 24 of each group are preferably longitudinally off-set for each other relative to the body, so that each successive lower handler 24 of each group is off-set outwardly relative to the upper handler and to the central duct portion C of the body. Through this relationship of elements it will be apparent that the film F carried by each handler 24 projects vertically upward therefrom to its respective film guide roller spaced from and clear of the films handled by the other handlers of the said group.

The groups of handlers 24 are spaced longitudinally of each other a sufficient distance apart to permit free uninterrupted vertical movement of the films F handled by each group of handlers 24 between adjacent groups to their respective guide rollers, whereupon they are directed horizontally inward toward the middle duct portion C to occur in sliding stacked relationship to each other as they pass between the glass panels 18 and 19 in the window W.

In practice, it is desirable to have the uppermost or top film of the group of films blank, that is, free of all markings and the like, and to have one frame of each of the other films blank and free of all markings. With this relationship of films it will be apparent that if any particular marking or type of feature is not present in the said groups of features on the plurality of films, the operator can arrange the blank frame of the film devoted to the particular feature, and then mark or draw upon the uppermost film the desired feature, or type of feature, not otherwise present. It also makes it possible for the operator to trace upon the uppermost film the image developed by the combined features of the plurality of lower films, and thereby established a permanent record thereof.

With the particular structure that applicant provides it will be apparent that any suitable light source, such as a bulb 50, diagrammatically illustrated in Fig. 3 of the drawings, can be advantageously placed between the inner end walls of the housing H to occur beneath the window W in the central duct portion C of the body, in a manner to suitably illuminate the plurality of films therein.

As stated above, the structure provided by the present invention is particularly suited to be used in combination with a picture projecting mechanism of the general character illustrated in Fig. 1 of the drawings, which projector includes a box-like cabinet 60 having a horizontally disposed top wall 61 with a centrally located transparent window W' therein, vertically disposed side and end walls 63 and 63, a condenser lens 64 in the cabinet adjacent the window W' therein, a light generating means 65 within the cabinet, a light reflector 66 within the cabinet adapted to direct light from the generating means 64 vertically through the condensing lens 64 and the window W', and a projector head 67 spaced vertically above the window W' and including a case 68, a projector lens 69 in the case adapted to receive light passed through the window in the body, and an image reflector 70 in the case receiving light from the lens and directing the light laterally to a suitable screen, or the like.

It will be apparent that by placing the body A of the image composing apparatus over the cabinet 60 of the projector, in the manner illustrated in Fig. 1 of the drawings, and so that the window W in the middle duct portion C of the composer is in register with the window W' in the projector cabinet 60, the light from the projector will be directed vertically through the window W in the composer and through the plurality of films F therein, with the result that the composite image established by the plurality of films F will be directed into the projector head 67 located above the cabinet and from the projector head 67 onto a suitable screen.

The body A of the composer is such that the central duct portion C rests on the top wall 61 of the projector cabinet 60 and the housings H at either end of the composer body A and depend therefrom to occur at opposite sides of the cabinet in such a manner as to maintain the composer in proper position and alignment with the projector at all times.

Having described only a typical preferred form and application of my invention, I do not wish to be limited or restricted to the specific details herein set forth, but wish to reserve to myself any variations or modifications that may appear to those skilled in the art and fall within the scope of the following claims.

Having described my invention, I claim:

1. An image composing apparatus wherein a plurality of elongate transparent film strips, each of which contains a plurality of longitudinally spaced markings, are adapted for parallel longitudinal movement in superposed, stacked, slidably-engaging relationship when passing below an image viewing aperture comprising, a pair of spaced box-like housings including side walls, a pair of elongate, horizontally disposed spaced plates integral with the upper portion of each of said housings and defining a narrow passageway joining together the interiors of said housings, each of said spaced plates having a central image viewing aperture therein, said apertures being vertically aligned, a plurality of shafts rotatably mounted in each of said housings, said shafts transversely extending between said side walls of said housings in parallel, spaced, horizontal rows, each shaft in each horizontal row below the uppermost horizontal row being longitudinally offset from the shaft immediately above it and forming a plurality of oblique, parallel rows, a spool for each of said film strips secured on each of said shafts, said shafts having a plurality of longitudinally spaced peripheral grooves at one end thereof, means on said housing adjoining said end releasably engageable with said peripheral grooves to permit sliding transverse movement of said shafts relative to said side walls of said housings, a guide means for each film strip located above said plurality of shafts and longitudinally offset from its respective shaft, each of said guide means in each housing being in a plane parallel to the uppermost horizontal row of shafts and parallel to said narrow passageway, and means external of said housings for rotating each of said shafts to cause longitudinal movement of said film strips relative to said housings from their respective spools over their respective guide means, said strips of film being in superposed, stacked, slidably-engaging relationship with each other when passing through said narrow passageway between said image viewing apertures.

2. An image composing apparatus as defined in claim 1 having a light projecting cabinet disposed between said box-like housings, the upper surface of said cabinet removably engageable with the lowermost surface of said elongate, horizontally disposed spaced plates, an aperture in said upper surface of said cabinet in direct vertical alignment with said image viewing apertures in said spaced plates, light generating means within said cabinet, a light reflector in said cabinet for directing a beam of light upwardly through said aperture, a rod mounted at one end of said cabinet and extending vertically upwardly therefrom, a projector head slidably mounted on said rod and located directly over said apertures, and an image reflector and projection lens within said projector head receiving said beam of light and projecting said image, formed by said plurality of film strips between said image viewing apertures, in a plane substantially perpendicular to the plane of the originally formed image.

3. An image composing apparatus as defined in claim 1 wherein said means permitting sliding transverse movement of each of said shafts includes a boss secured to and laterally projecting from the exterior of said side wall, said boss having a central longitudinal opening extending therethrough substantially perpendicular to and passing through said side wall, said end of said shaft having said longitudinally spaced peripheral grooves disposed within said central longitudinal opening, said boss having a lateral opening in communication with said longitudinal opening, a ball within said lateral opening, and a compression spring yieldingly urging said ball into engagement with one of said spaced peripheral grooves on said shaft to lock said shaft relative to said side wall.

References Cited in the file of this patent

UNITED STATES PATENTS

| | | |
|---|---|---|
| 198,589 | Fabrozius | Dec. 25, 1877 |
| 1,198,600 | Sudmann | Sept. 19, 1916 |
| 1,247,227 | Cooper | Nov. 30, 1917 |
| 1,415,712 | Rontey et al. | May 9, 1922 |
| 1,596,936 | Mengden | Aug. 24, 1926 |
| 2,167,518 | Lins | July 25, 1939 |
| 2,210,333 | Kroner | Aug. 6, 1940 |
| 2,669,156 | FitzGerald | Feb. 16, 1954 |

UNITED STATES PATENT OFFICE
CERTIFICATE OF CORRECTION

Patent No. 2,813,457 November 19, 1957

Harold Graves FitzGerald

It is hereby certified that error appears in the above numbered patent requiring correction and that the said Letters Patent should read as corrected below.

In the grant, lines 1 and 12, and in the heading to the printed specification, line 3, name of inventor, for "Harold Groves Fitz Gerald", in each occurrence, read -- Harold Graves FitzGerald --.

Signed and sealed this 17th day of February 1959.

(SEAL)
Attest:
KARL H. AXLINE
Attesting Officer

ROBERT C. WATSON
Commissioner of Patents